(12) United States Patent
Classen

(10) Patent No.: US 8,068,105 B1
(45) Date of Patent: Nov. 29, 2011

(54) VISUALIZING AUDIO PROPERTIES

(75) Inventor: Holger Classen, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 712 days.

(21) Appl. No.: 12/176,171

(22) Filed: Jul. 18, 2008

(51) Int. Cl.
*G06T 11/20* (2006.01)
(52) U.S. Cl. ........................................................ 345/440
(58) Field of Classification Search .................. 345/440; 381/118, 119
See application file for complete search history.

(56) References Cited

U.S. PATENT DOCUMENTS

| | | | |
|---|---|---|---|
| 5,212,733 A * | 5/1993 | DeVitt et al. | 381/119 |
| 5,812,688 A * | 9/1998 | Gibson | 381/119 |
| 6,532,024 B1 * | 3/2003 | Everett et al. | 715/716 |
| 7,099,482 B1 | 8/2006 | Jot et al. | |
| 7,248,701 B2 | 7/2007 | Gerrard et al. | |
| 7,589,727 B2 * | 9/2009 | Haeker | 345/440 |
| 2003/0007648 A1 | 1/2003 | Currell | |
| 2011/0002469 A1 | 1/2011 | Ojala | |

* cited by examiner

*Primary Examiner* — Ryan R Yang
(74) *Attorney, Agent, or Firm* — Fish & Richardson P.C.

(57) ABSTRACT

Technologies relating to user interfaces for visualizing audio properties. In some implementations, a method is provided that includes the actions of receiving one or more audio signals including digital audio data; generating one or more audio objects, each of the one or more audio objects representing one or more audio signals; and displaying an interface for representing properties of the audio objects, the interface including a region where each location within the region represents two or more audio properties relative to a virtual listener.

51 Claims, 11 Drawing Sheets

VISUALIZING AUDIO PROPERTIES

BACKGROUND

The present disclosure relates to user interfaces and visualization of audio data.

Audio signals including audio data can be provided by a multitude of audio sources. Examples include audio signals from an FM radio receiver, a compact disc drive playing an audio CD, a microphone, or audio circuitry of a personal computer (e.g., during playback of an audio file).

When audio signals are provided using microphones, one or more of the microphones are usually associated with particular audio signals, e.g., a musician playing an instrument in an orchestra or a person singing in a band. Additionally, the number of microphones used to capture particular audio signals can be high. In such a setting, it is not uncommon to collect audio signals using microphones from thirty or more sources. For example, a drum set alone may require five or more microphones. Individual groups of instruments can have one or more microphones in common (e.g., in an orchestral setting). Additionally, single instruments are often exclusively associated with one or more microphones.

Audio sources, regardless of the way the audio signals are provided (i.e., whether providing signals using microphones or not), provide signals having different properties. Examples of properties include signal intensity, signal kind (e.g., stereo, mono), stereo width, and phase (or phase correlation, e.g., of a stereo signal).

The process of modifying the properties of multiple audio signals in relation to each other, in relation to other audio signals, or combining audio signals is referred to as mixing. A device for such a purpose is referred to as a mixer or an audio mixer. A particular state of the mixer denoting the relationship of multiple audio signals is typically referred to as a mix.

Generally, an audio mixer has a number of input channels, busses, and output channels. The audio mixer can selectively route the audio signals from particular input channels to one or more output channels. In the mixer, audio signals can be conditioned according to parameters specified by a user. Conditioning can include, for example, adjusting the signal intensity (i.e., the mixer channel output level) of an overall audio signal or adjusting the signal intensity in a specified frequency range. Parameters can include, for example, values for applying a gain to an audio signal (e.g., by increasing or decreasing the overall intensity of the signal) or values for adjusting the signal intensity over a specified frequency range (e.g., as part of an equalization operation).

An audio mixer generally has a number of faders, also referred to as sliders or attenuators. Each fader controls the intensity of an audio signal on an input channel or a group of input channels. This structure exists in software as well as in hardware mixers. Generally, to adjust both the individual intensities of the audio signals and the overall signal intensity of a mix, several adjustments of each fader can be performed in order to achieve a desired result. For example, different faders can be adjusted to set the intensity of each signal at a desired level in relation to the other audio signals and setting the combined audio signal of all the audio sources, i.e., the overall signal intensity.

In a digital audio workstation (DAW), the layout of an audio mixer is usually derived from an analog counterpart and, therefore, usually involves a number of channel strips. For example, an audio source is connected to the "top" of a channel strip and the signal runs through a series of components, e.g., a gain stage, an equalizer, a compressor, one or more aux sends, one or more bus sends, a pan/balance control, and a fader, before being routed to an output or to a combiner, e.g., a stereo summing bus.

Usually, interaction with a user interface of a software mixer involves a cursor controlled through a pointing device, e.g., a mouse, trackball, touchpad, or joystick. Adjustments to a slider control type mixer are made, for example, by positioning the cursor over the knob of a graphic representation of a fader, holding down a button of the pointing device, moving it to the desired position, and releasing the button. Another kind of input device may be employed, e.g., a keyboard, keypad, or dedicated hardware controller. In any case, several adjustments of the faders are used to set the intensity of a number of audio signals relative to each other and for setting the overall signal intensity.

The process of mixing can include a display or visualization of audio properties. Signal intensity, for example, is traditionally conveyed using level meters, such as defined in the standards IEC 60268-10, IEC 60268-17, and IEC 60268-18. An example for a level meter is a VU meter or volume unit meter. A VU meter can be implemented as a magnetoelectric VU meter in which a needle is moved from an initial position towards another position according to the flow of electric current through the meter. Other properties of the signal can also be visualized, e.g., using phase correlation meters, peak level meters, or goniometers.

Properties of audio signals have been visualized, e.g., using analog meters, before the wide use of digital electronic equipment. As a result, for most of the traditional devices for visualization of signal properties a digital equivalent for use in software user interfaces has been devised. Thus, for example, the controls of a digital audio mixer can include a visual representation of analog controls (e.g., an analog VU meter) in order to provide a familiar representation of the device traditionally used.

SUMMARY

This specification describes technologies relating to user interfaces for visualizing audio properties.

In general, one aspect of the subject matter described in this specification can be embodied in methods that include the actions of receiving one or more audio signals including digital audio data; generating one or more audio objects, each of the one or more audio objects representing one or more audio signals; and displaying an interface for representing properties of the audio objects, the interface including a region where each location within the region represents two or more audio properties relative to a virtual listener. Other embodiments of this aspect include corresponding systems, apparatus, and computer program products.

These and other embodiments can optionally include one or more of the following features. The region has a first dimension representing one or more first audio properties and a second dimension representing one or more second audio properties relative to the virtual listener. The one or more first audio properties includes intensity and the one or more second audio properties includes balance and stereo width. The method further includes displaying a representation of the virtual listener relative to the interface. The method further includes displaying a corresponding representation of each of the one or more audio objects within the interface where the location of a particular audio object representation within the region corresponds to the one or more audio properties in the first and second dimensions. The location of a particular audio object identifies an intensity and a balance or panorama associated with the one or more audio signals corresponding to the audio object.

Displaying each representation of an audio object further includes displaying a representation having a specified width representing a stereo width of the one or more audio signals corresponding to the audio object. Displaying the interface further includes displaying one or more meters, the one or more meters corresponding to audio properties associated with one or more audio objects. The one or more meters include one or more of a level meter, a phase correlation meter, and a goniometer. At least one of the one or more meters displays audio properties associated with a particular audio object in response to an input selecting the particular audio object.

Displaying the region further includes displaying a rectangular region having a first axis and a second axis where a first position of an audio object, according to the first axis, is associated with intensity of a particular audio signal associated with the audio object; a second position of an audio object, according to the second axis, is associated with a balance or panorama associated with the one or more audio signals; and a size of an audio object according to at least one of dimension is associated with a stereo width. Displaying the region further includes displaying a region bound by an inner circle and an outer circle, the region having an orientation, the orientation being a reference angle associated with an angular dimension relative to a reference region within the inner circle and where a radial distance of an audio object is associated with intensity of a particular audio signal associated with the audio object; an angular distance of the audio object is associated with a balance or panorama of the audio object; and a size of the audio object is associated with a stereo width.

The method further includes identifying a change in an audio property associated with a particular displayed audio object; and modifying the position of displayed audio object according to the identified change. The position along the first axis is modified if the identified change is of intensity. The position along the second axis is modified if the identified change is of balance or panorama. A size of the audio object is modified if the identified change is in stereo width. Identifying a change further includes periodically analyzing the one or more audio signals associated with the audio object.

Particular embodiments of the subject matter described in this specification can be implemented to realize one or more of the following advantages. The system displays several properties of audio signals as audio objects in a single user interface, whereas an audio object is created in response to a valid routing of an audio signal to a bus or a physical output associated with the audio object.

The user can discern audio properties by viewing displayed visual properties of objects, e.g., an object's position or size.

The audio stage displays inherently invisible properties of audio signals, e.g., signal level or stereo width. A number of additional visual elements (e.g., audio objects or controls) can be displayed in order to illustrate additional properties in place of or in addition to properties shown using traditional meters.

Using this approach, multiple audio objects can be displayed simultaneously on an audio stage. By using the output of multiple stages as corresponding audio objects in a master stage, large numbers of objects can be managed simultaneously, introducing clear structures while maintaining a high degree of usability and overview for the user. This can also be referred to as grouping or sub-grouping of audio objects.

The system provides a flat hierarchy of different levels in the user interface so that a user can manage and modify signal attributes and properties as objects in the user interface in an easy and intuitive manner that facilitates the display or mixing of a great number of audio signals.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 2C shows an example user interface for configuring a plug-in.

Like reference numbers and designations in the various drawings indicate like elements.

DETAILED DESCRIPTION

Figure 1A:
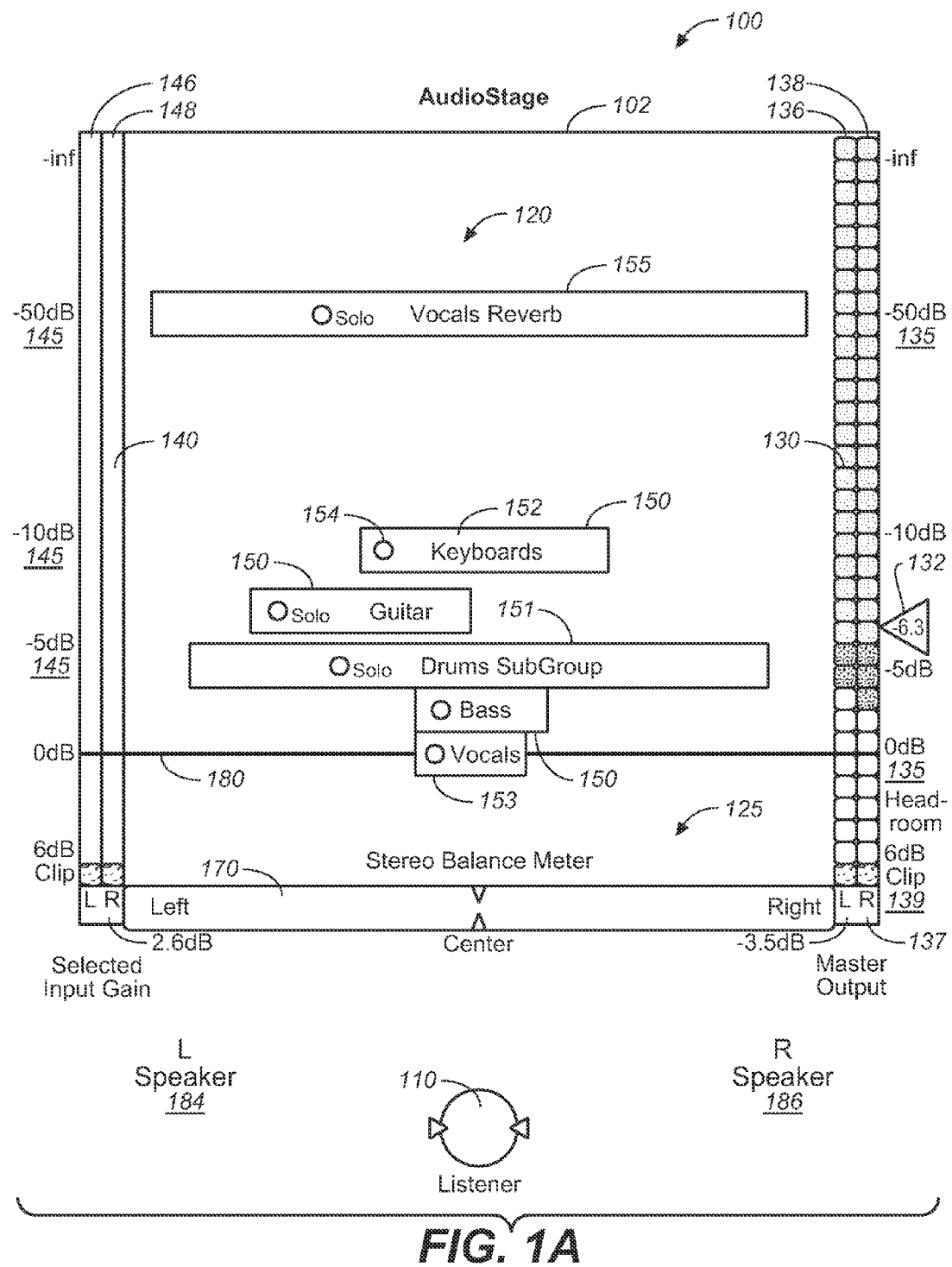
FIG. 1A is an illustration of an example user interface.

FIG. 1A is an illustration of an example user interface 100. The user interface 100 provides for the visualization of audio properties of audio signals of audio sources. The user interface 100 is provided, for example, as part of a system including a digital audio workstation (DAW).

The user interface 100 displays several audio objects 150. Each audio object 150 represents audio signals in a user interface 100 on or within a display area referred to as an audio stage 102 (or simply a "stage"). Audio sources provide audio signals. Both audio sources and audio signals have associated properties. For convenience, unless explicitly specified, an audio source and the audio signals produced by the audio source will be referred to in combination as an audio object (or simply an "object").

In some implementations, the system creates an audio object 150 in response to the presence of a valid routing of an audio signal from an input channel to one or more busses and/or output channels. A valid routing of an audio signal can be, for example, the association of an input channel, to which a signal is presented to, and an output channel of a particular DAW. Another example for a valid routing can be the selection of a file stored on a computer readable medium, containing audio data, associated with a track of a non-linear editor (NLE) timeline, which is associated with a mixer input that has a valid output routing, e.g., either to a bus or to a physical output. The features described in relation to a DAW are also usable in connection with any kind of NLE (or similar audio component) integrated in a video editing system. A track is a distinct section of an audio signal, usually having a finite length and including at least one distinct channel. For example, a track can be digital stereo audio data contained in an audio file, the audio data having a specific length (e.g., running time), that is included in a mix by assigning a specific start time and other mixing parameters.

For convenience, no distinction is made between the visual representation (e.g., symbol, icon, rectangular graphic object) corresponding to an audio object 150 and the audio object 150 itself. Apart from the audio signal properties and the audio source properties described above, the audio objects 150 also feature visual properties and include data or data structures facilitating visual representation of the audio objects 150 as visual elements (e.g., icons) in a user interface.

The system can position the audio objects 150 anywhere on the stage 102, e.g., at the front (lower portion) or at the back (upper portion) of the stage 102, as well as off center to the left or to the right on the stage 102. The position of a particular object is determined by multiple signal attributes. Additionally, the system displays the position of a virtual listener 110, represented by an icon in the user interface, at or below the bottom of the audio stage 102. The virtual listener 110 represents the destination of the overall output, e.g., a user listening to the audio output of a system or a microphone. Furthermore, the system displays a left speaker 184 and a right speaker 186, positioned left and right from the virtual listener 110 and between the virtual listener 110 and the stage 102. This display corresponds to an arrangement representing audio signals produced, for example, by generic stereo audio playback equipment having two output channels, e.g. the left and right speakers 184 and 186.

In some implementations, the user interface 100 includes a stereo balance meter 170 displayed at the lower end of the stage 102. In some implementations, the position of the virtual listener 110 and/or the positions of the left and right speakers 184, 186 are not displayed. The virtual listener 110 can represent one or more potential consumers of a collective audio signal including the signals of all audio sources represented within the audio stage 102.

The setting shown in the user interface 100 resembles an intuitive and common association of a real-life setting where audio sources, e.g., musicians playing individual instruments are positioned on a stage and a listener, for example, a human listener (e.g., a consumer of audio signals) or a device listener (e.g., a microphone) is positioned in front of a stage. The listener can then listen (consume) the audio signals produced by the musicians. Intuitively, musicians positioned at the front of the stage are perceived to be louder than musicians producing audio signals of equal intensity but are positioned at the back of the stage. Similarly, musicians positioned on the left are perceived more from the left, and those positioned on the right are perceived more from the right.

As shown in FIG. 1A, audio objects 150 can be positioned, by the system or by a user, on the stage 102 within the areas 120 and 125 of the stage 102. In this example, a divider 180, positioned between areas 120 and 125 of the stage 102, denotes the positions where an original signal intensity of an audio object 150 and a reference intensity are identical. The divider 180 is positioned according to the scale (e.g., a dB scale) used. In particular, the scale is a logarithmic scale with a minimum of −∞, the divider 180 is positioned at the reference level (0 dB) and a headroom from reference level to maximum (e.g., 6 dB) according to the selected meter scale 130. The divider 180 can be located at other positions, for example, at the bottom of the stage 102 or at the top of the stage 102. Audio objects 150 that have a signal intensity that is higher than the reference intensity denoted by line 180 are positioned in area 125 of the stage 102. Similarly, audio objects 150 that have a signal intensity that is lower than the reference intensity denoted by line 180 are positioned in area 120 of the stage 102.

In general, signals provided by an audio source are perceived by a human listener at a specific intensity that depends on, among other factors, the distance between the listener and the audio source. Analogously, on the stage 102, the intensity of a signal associated with an audio object 150 varies according to a scale (e.g., the dB scale shown at discrete intervals 135) with the distance of the audio object 150 to the front of the stage 102. An audio object 150 having a signal intensity of −∞ (−inf.) is positioned by the system at the top end of the stage 102 (and, therefore, at the top end of the area 120 of the stage 100) and the signal of this audio object 150 will not be audible to the virtual listener 110. An audio object 150 having a signal intensity that is higher than the reference intensity is positioned by the system at the lower end of the stage 100 (and, therefore, within the area 125 of the stage 100), near the stereo balance meter 170.

Figure 1B:
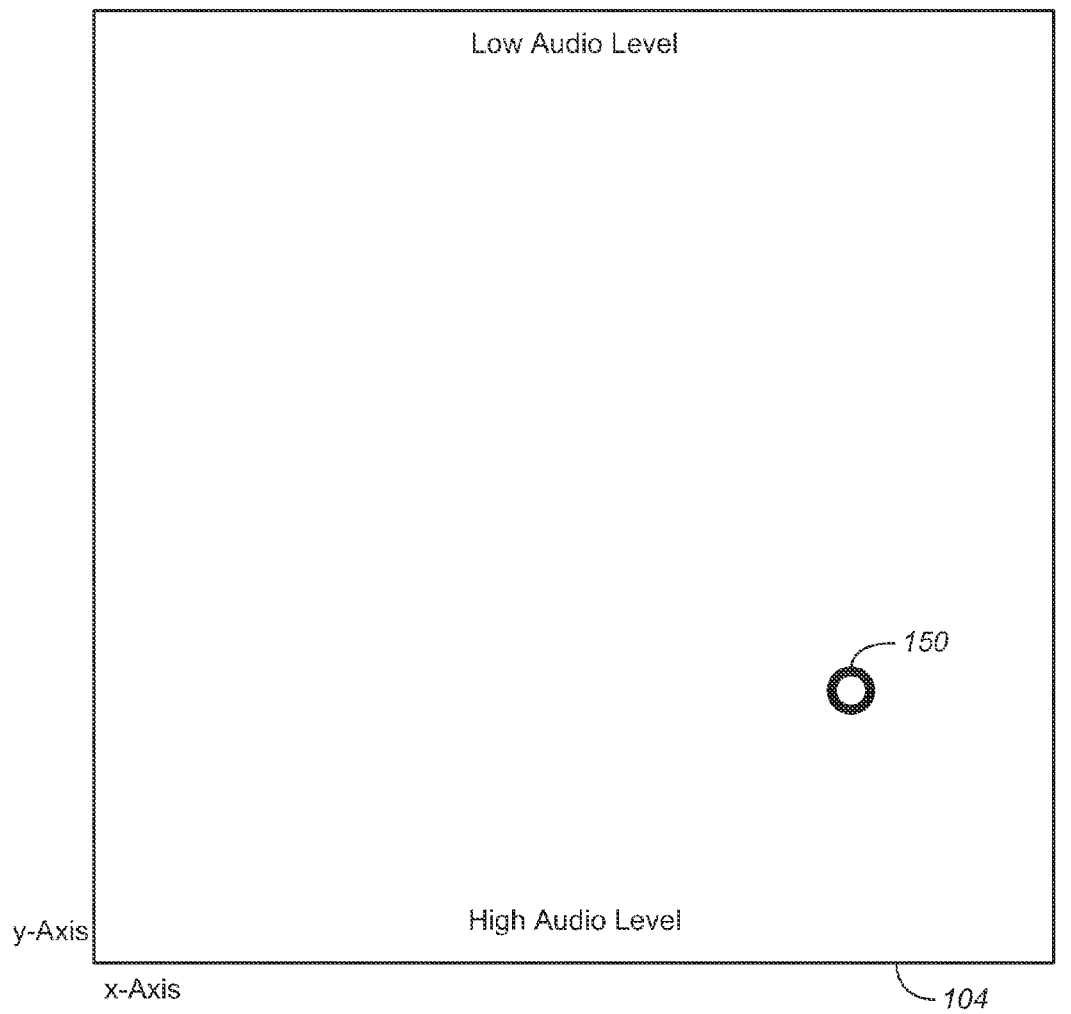
FIG. 1B is an illustration of an example user interface showing a simplified audio stage.
Figure 1B:
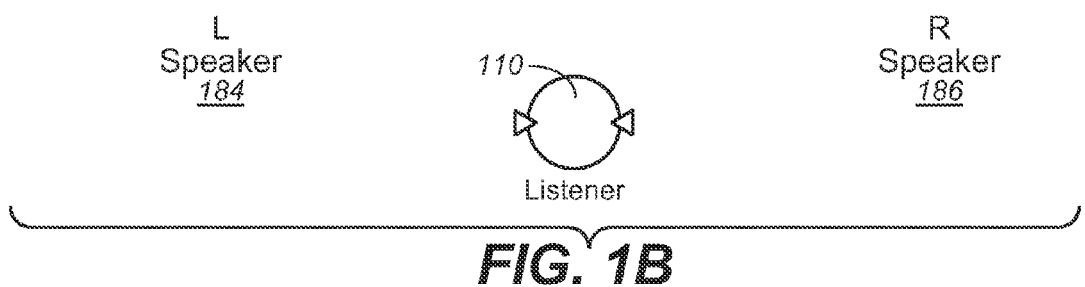

FIG. 1B is an illustration of an example user interface showing a simplified audio stage 104. For clarity, only a few elements are shown including the virtual listener 110 and the audio object 150. In some implementations, some elements, e.g., the virtual listener 110 or specific channels 184, 186 are not displayed or their display can be toggled on or off. In the example stage 104, the audio object 150 is position to the right and near the bottom, which corresponds to slightly reduced signal intensity (in relation to the reference level denoted by the line 180) and a pan/balance of the signal adjusted towards the right channel.

Figure 1C:
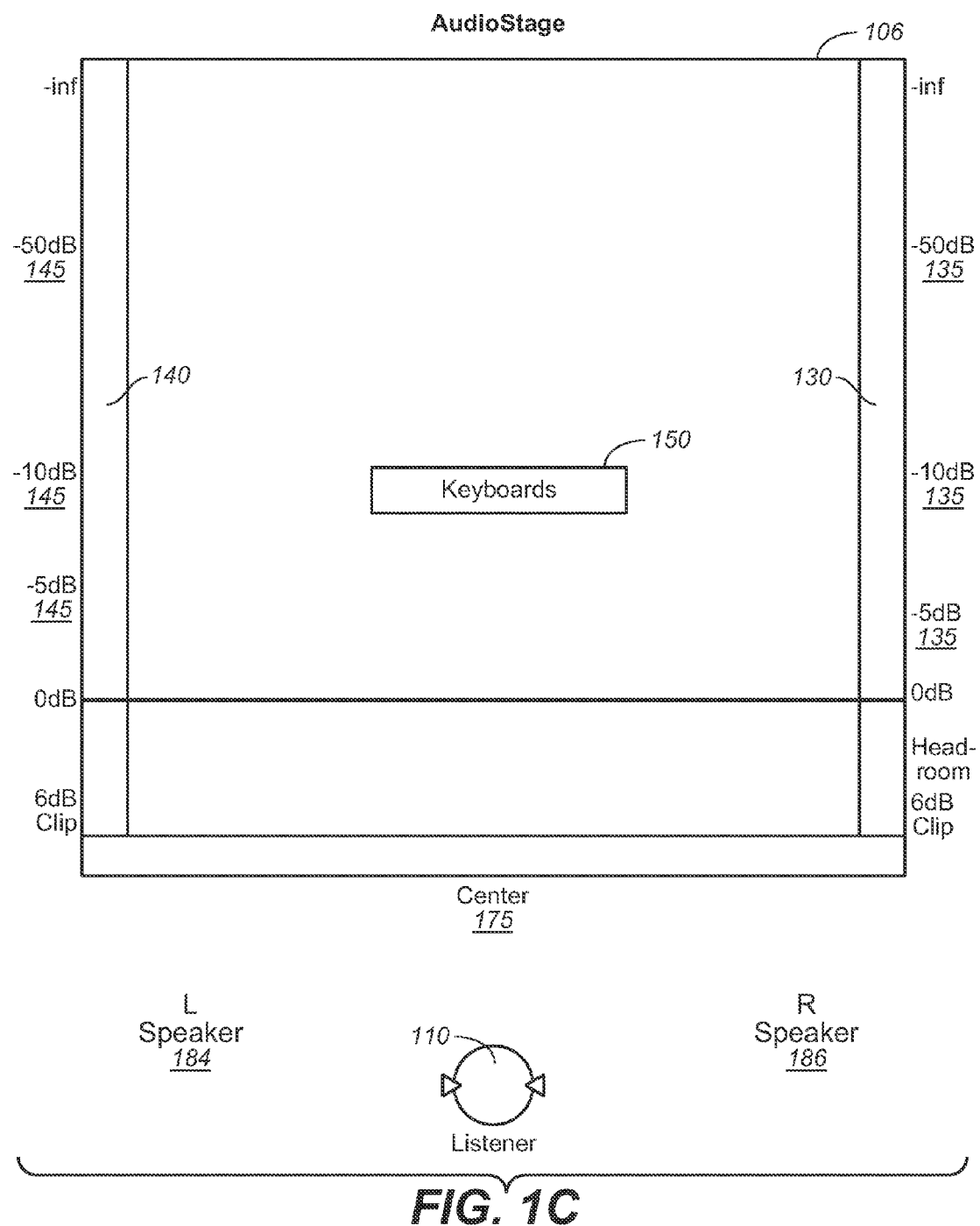
FIG. 1C is an illustration of an example user interface showing another simplified audio stage.

FIG. 1C is an illustration of an example user interface showing another simplified audio stage 106. In the example shown in FIG. 1C, also only a few elements are shown including a virtual listener 110, an audio object 150, and scales 130, 140 for displaying signal levels are shown using discrete values 135 and 145. As shown in FIG. 1C, the audio object 150 has a rectangular shape that facilitates identification of the object, e.g., placing a text identifier on the associated icon.

Different visual properties (e.g., shape, color) of icons associated with audio objects 150 can be used, e.g., to convey different kinds of audio sources or specific properties, or to facilitate placement of specific controls. For example, the visual properties can convey the audio source by text name (e.g., guitar, keyboards, vocals). Additionally, the specific audio properties can include an indication of state for the audio object (e.g., a solo-state) as well as identifiers for one or more plug-ins associated with the audio object. In some implementations, the visual properties of icons is changed according to different modes of operation (e.g., when an object is selected or de-selected).

The visualization of elements on a particular audio stage, e.g. stages 102, 104, and 106, as shown in FIG. 1A, FIG. 1B, and FIG. 1C, respectively, can be adapted to a wide variety of application scenarios. In some implementations, a simplified audio stage, e.g. stage 104, is displayed, e.g., due to limited resources of the devices used or user preferences.

Figure 4:
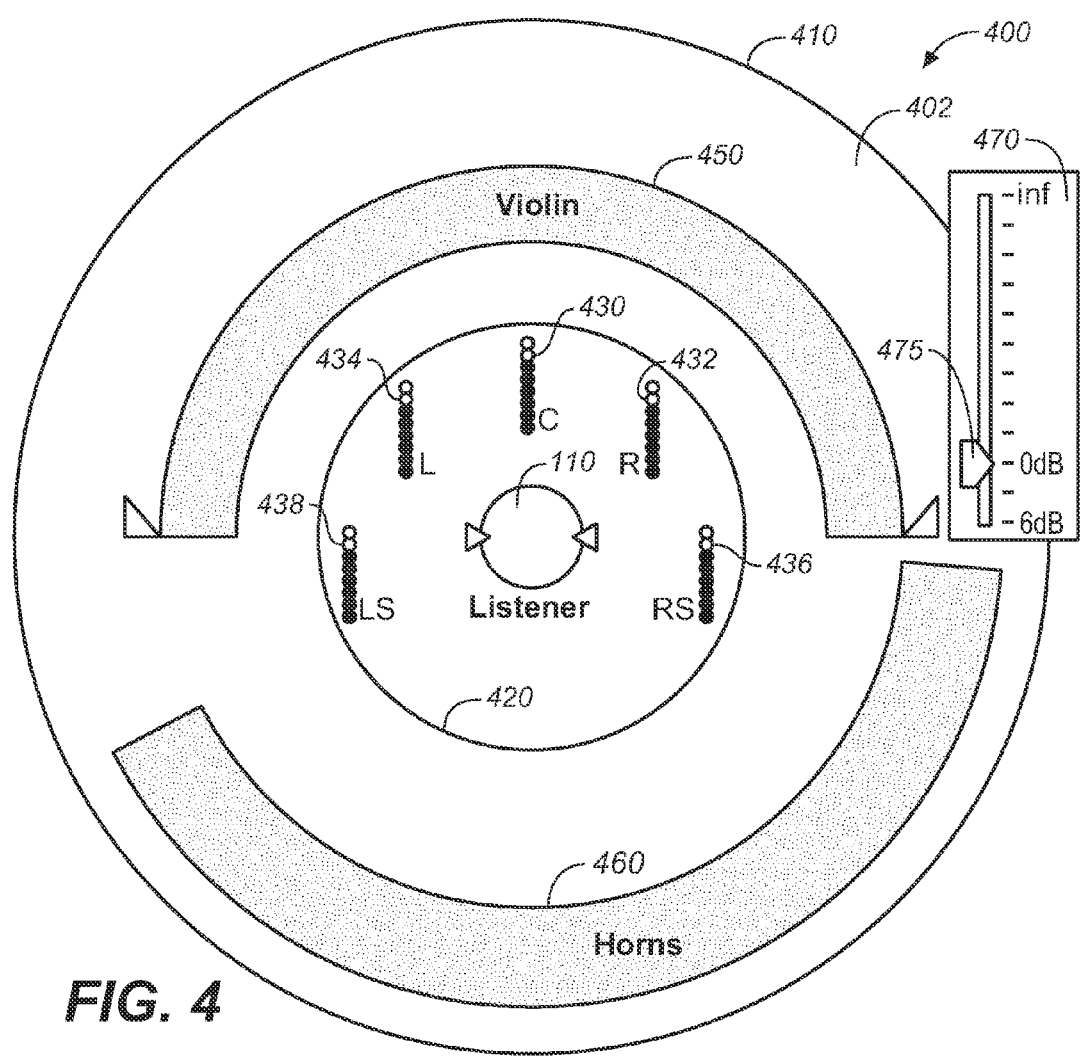
FIG. 4 is an illustration of an example multi-channel user interface.

FIG. 4 is an illustration of an example multi-channel user interface 400. The multi-channel user interface 400 includes a stage 402. The stage 402 is shown as having a circular shape delimited by concentric circles 410 and 420 providing a region in which audio objects can be positioned. Additionally, the virtual listener 110 is positioned at the center of the stage 402 and, therefore, the circles 410 and 420.

Also shown within the stage 402 are level meters 430, 432, 434, 436 and 438. Each level meter shows a particular signal intensity associated with one or more different audio output channels. The level meters can also be regarded as representing speakers, e.g., analogous to the speakers 184 and 186 as shown in FIG. 1A (whereas in FIG. 1A only two speakers are presented). In addition to a left and right channel, a multi-channel audio system can feature, for example, a center channel and two or more surround channels (e.g., left surround channel represented by level meter 438 and right surround channel represented by level meter 436).

The stage 402 also includes audio objects 450 and 460. In this example, the audio objects 450 and 460 have a crescent shape and are positioned between concentric circles 410 and 420. The audio objects 450 and 460 have properties associated with the stage 402, e.g., a distance from circle 410 or circle 420 and an angular position relative to a reference angle (e.g. defined by the positions of the virtual listener 110 and a reference position of a center channel).

An object width spans a specific angle, denoting the width of an associated audio signal in relation to a number of channels corresponding to the stage 402. The width of a multichannel signal denotes the presence of the signal in specific channels. The signal represented by the object 450, for example, spans the left, center, and right channel, as well as, to a limited extent, the left and right surround channel. In contrast, the signal represented by object 460 spans only the left and right surround channel, with a slight bias towards the right surround channel. An additional triangle-shaped control (fader) 475 along with a scale 470 can be displayed on one side of the icon associated with an object, e.g., object 450, when the object is selected. The stage 402 can feature additional elements (e.g., controls and meters) as described in connection with other stages in, e.g., FIGS. 1A, 1B, or 1C, A monaural (mono) signal, for example, has a stereo width of 0, whereas a mono compatible stereo signal has a stereo width of 1. A stereo signal can be reduced to a mono signal by combining the two signals (e.g., left and right channel) of the stereo signal into a single signal. If a stereo signal can be reduced to a mono signal without major parts of the two stereo signals canceling each other out, then it is mono compatible. A stereo signal that features two signals that are completely out of phase (e.g., cancel each other out completely) has a stereo width of 2. Here, the values 0, 1, and 2 assigned to different stereo widths are chosen from a range of positive numbers. In some implementations, other values are chosen (e.g., −1, 0, and 1, as also used with some phase correlation meters). In some other implementations, a different number of channels are visualized in the same or another manner.

In some implementations, traditional level meters are additionally shown, e.g., on either side of the stage. As shown in FIG. 1A, for example, traditional level meters 130 and 140 are provided on either side of the stage 102. The additional meters can display, e.g., an input level, an overall output level, an output level of a subgroup, or an output level of a single object. Additional meters, e.g., level meters or phase correlation meters, can be used to convey signal properties by providing a familiar representation of the property of a signal.

As shown in FIG. 1A the system also displays a master level meter 130 in the user interface 100 that shows a master output level or an overall signal intensity of a master output. The master level meter 130 includes meters 136 and 138 to display the level of a left and right channel of a master signal, respectively. A suitable scale for the level is shown using discrete values 135. In some implementations, the scale of the meter 130 is a decibel (dB) scale which ranges from −∞ at the top of the meter to a maximum value at the bottom (e.g., +6 dB).

In some implementations, different levels are displayed using distinct colors. For example, a signal level from −∞ to −5 dB is displayed in a green color, a signal level from −5 dB to 0 dB is displayed in a yellow color, and a signal level above 0 dB is displayed in a red color.

In some implementations, the system displays a current signal level 137 at the bottom of the meter, for example, in a decimal format. In some other implementations, the system allows for adjusting the master level by a user, e.g., by vertically moving a control 132.

In some implementations, the system displays an individual level meter 140 in the user interface 100 that shows an output level of a selected audio object. A selected object can be displayed visually distinct from other objects, e.g., using a different shape or color, featuring additional controls, or by any suitable form of highlighting. The individual level meter 140 includes meters 146 and 148 to display the level of a left and right channel, respectively, of the audio signal associated with the selected object. An example scale for the individual level is shown using discrete values 145. In the example depicted in FIG. 1A, the scale of the individual level meter 140 is a decibel (dB) scale that ranges from −∞ at the top of the meter to +6 dB at the bottom. In some implementations, the individual level meter 140 has similar additional features (e.g., a control corresponding to control 132) as described above in regard to the master level meter 135.

In some implementations, the individual level meter 140 shows an input or an output level of a selected audio object, according to a position of the meter in the signal chain. The position of a meter in a signal chain can be user-selectable.

Traditionally, to determine a balance of an audio signal (also referred to as "pan", or "panorama" for a monaural signal) the user of sound mixing equipment can look at the setting of a pan-knob or similar control (e.g., a pan-knob implemented as an icon/control in audio software). For determining the intensity of a signal, the user can look at a meter, e.g., a level meter, as commonly known from sound recording equipment either implemented in hardware or in software.

By contrast, as illustrated by the audio stage 102, the user is able to discern both intensity and pan/balance of a particular audio signal by looking at the position of the corresponding audio object 150 on the stage 102. The stage 102, therefore, conveys information about the two properties of the signal through the spatial properties of a single audio object 150, namely its horizontal and vertical position on the stage 102.

In some implementations, the vertical position of an audio object 150 is adjusted by the system based on an output of a level analyzer. The level analyzer generates data corresponding to a current or average signal level of an audio source.

In some implementations, changes of audio properties (e.g., changes in the signal intensity) are displayed by the system through movements (e.g., vertical movements) of the corresponding object or objects directly in response to the changes over time. For example, the signal intensity for a particular audio object can change over time (e.g., from soft to loud). The position of the audio object on the stage can change according to the change in signal intensity. In some implementations, a smoothing mechanism or smoothing function is used to avoid unnecessarily quick or unwanted movement (e.g., unwanted quick movement) of the corresponding object or objects. In some implementations, a smoothing function is used to compensate for the different temporal resolution of aural and visual reception capabilities of a human being. For example, the movements can be adjusted based on an average value determined according to several samples of a signal observed or obtained over a certain period of time.

By contrast, a traditional pan-knob is an input instrument that is used for setting a pan/balance value, and a level meter is an output instrument that is used for displaying an intensity value of a signal. Typically, the pan-knob is not used to dynamically display changes to the pan/balance of a signal. Similarly, a level meter is typically not used to actively adjust the intensity of a signal. The information about the pan/balance and the intensity of a signal, is traditionally conveyed by two instruments that each have very distinct uses and purposes. One purpose is the modification of an audio property; the other purpose is the display of an audio property.

Through the stage 102, the system can visualize another property of a signal, namely the stereo width of a signal. This property of a signal is visualized through a display property of the corresponding audio object 150. The system conveys the value of the stereo width of a signal through the width of the audio object 150 (i.e., the width of the corresponding icon). The audio objects 150 displayed within the stage 102 have different widths. For example, the lowest object 153, "vocals", and the topmost object 155, "vocals reverb", illustrate different stereo widths. While the visualization properties of the object 153 indicate a narrow stereo width of the associated signal, the visualization properties of the object 155 indicate a comparatively wide stereo width. Thus, by looking at the stage 102, and, in particular, looking at the visualization properties of the audio objects 150, 153, and 155, the user can discern multiple properties of the audio signals corresponding to the audio objects 150, 153, and 155.

As described above, an object is created in response to the presence of a valid routing of an audio signal. In contrast to other audio objects 150 and 153 shown in the stage 100, the object 155 has not been created as a result of an input from one of a number of input channels. Instead it is a result of a routing to an aux send and a subsequent routing to a subgroup output. Thus, the object 155 has been created in response to an internal valid routing of an audio signal.

In some implementations, the width of an audio object 150 is adjusted by the system based on the output of a stereo width analyzer (e.g., a phase difference analyzer or a goniometer). A stereo width analyzer generates data corresponding to the stereo width of an audio source. In some implementations, the system also modifies the width of an object according to a smoothing function as described above in relation to the display of signal intensity. In some implementations, a phase difference meter is displayed in the user interface. In some implementations, a goniometer is displayed in the user interface. A goniometer can be used to display several signal properties, e.g., the phase of a signal, the phase correlation of the two channels of a stereo signal, or the mono compatibility of a stereo signal. The system can use these meters or other additional meters to display the audio properties of a single or multiple audio sources dependent on a current display or operating mode or a selected state of an audio object 150.

In some implementations, objects have a property determining the opacity of the object. As the system displays objects according to their properties, objects with similar properties can be displayed at the same position or near to each other. The system facilitates the display of multiple objects at identical or very similar positions by giving the corresponding icons a transparent appearance according to an opacity factor. Therefore, objects at identical or similar positions are distinguishable and accessible by a user in the user interface. The system can modify other visual properties (e.g., size, shape, color, or associated controls) in order to provide distinguishable objects.

In some implementations, visual properties of the audio objects 150 are adjusted by the system according to data generated by a number of analyzers as described above (e.g., a level analyzer and a stereo width analyzer).

In some implementations, the changes of one or more audio properties of one or more objects are displayed dynamically. For example, if, over time, the signal intensity or the stereo width of one or more audio objects 150 changes, the changes can be reflected in the display properties of the one or more audio objects 150. When the intensity of a signal changes, the system changes the vertical position of the corresponding audio object 150 accordingly. Similarly, when the stereo width of a signal changes, the system changes the width of the corresponding audio object 150 accordingly.

In some implementations, objects reflect the behavior of a traditional meter. For example, an object's position is updated at regular intervals or continuously during play. When audio playback is paused, object positions are "frozen" at their current position when paused, and, when audio playback is stopped, object positions fall to −∞. This behavior may be overridden in some situations, for example, when an object is selected in order to adjust object properties.

For example, the audio properties of an object can be processed in order to dynamically display any changes in these properties. If the level of a signal slowly increases (e.g., fades in at the beginning of a track), then the corresponding audio object 150 starts to move from an initial position at the top of the stage 102 towards the bottom part of the stage 102. If the level of a signal decreases again (e.g. fades out at the end of a track), then the corresponding audio object 150 starts to move from a current position on the stage 102 towards the top part of the stage 102.

In another example, the control data of an audio mixer can be processed in order to dynamically display changes in the audio mixer controls instead of the corresponding audio properties. In a mixing environment, audio properties can be adjusted continuously or at regular or irregular intervals using audio mixer controls. For example, in addition to fading in and fading out of a signal, the signal intensity of an object can be changing over time. For example, in speech recording, the signal intensity of a recording of a human voice often changes substantially according to movements of the head of the speaker in relation to the microphone (e.g., a singer's physical movement relative to the microphone). This can result in a recording where the intensity of a signal changes repeatedly over time in an unwanted manner. Controls of the audio mixer can be used to repeatedly adjust the intensity of a signal in order to reduce level differences, for example, to repeatedly adjust the signal intensity to be more constant.

Timeline key frames or other automation data can be processed by the system in order to display adjustments to audio mixer controls. The system can be used to record automation data in a manner commonly known and used with audio mixing or audio processing equipment. Other automation data recording and/or storage methods, for example, methods not relying on key frames, can also be used.

Additionally, one or more smoothing mechanisms can be implemented to smooth or dampen object movements.

Figure 2A:
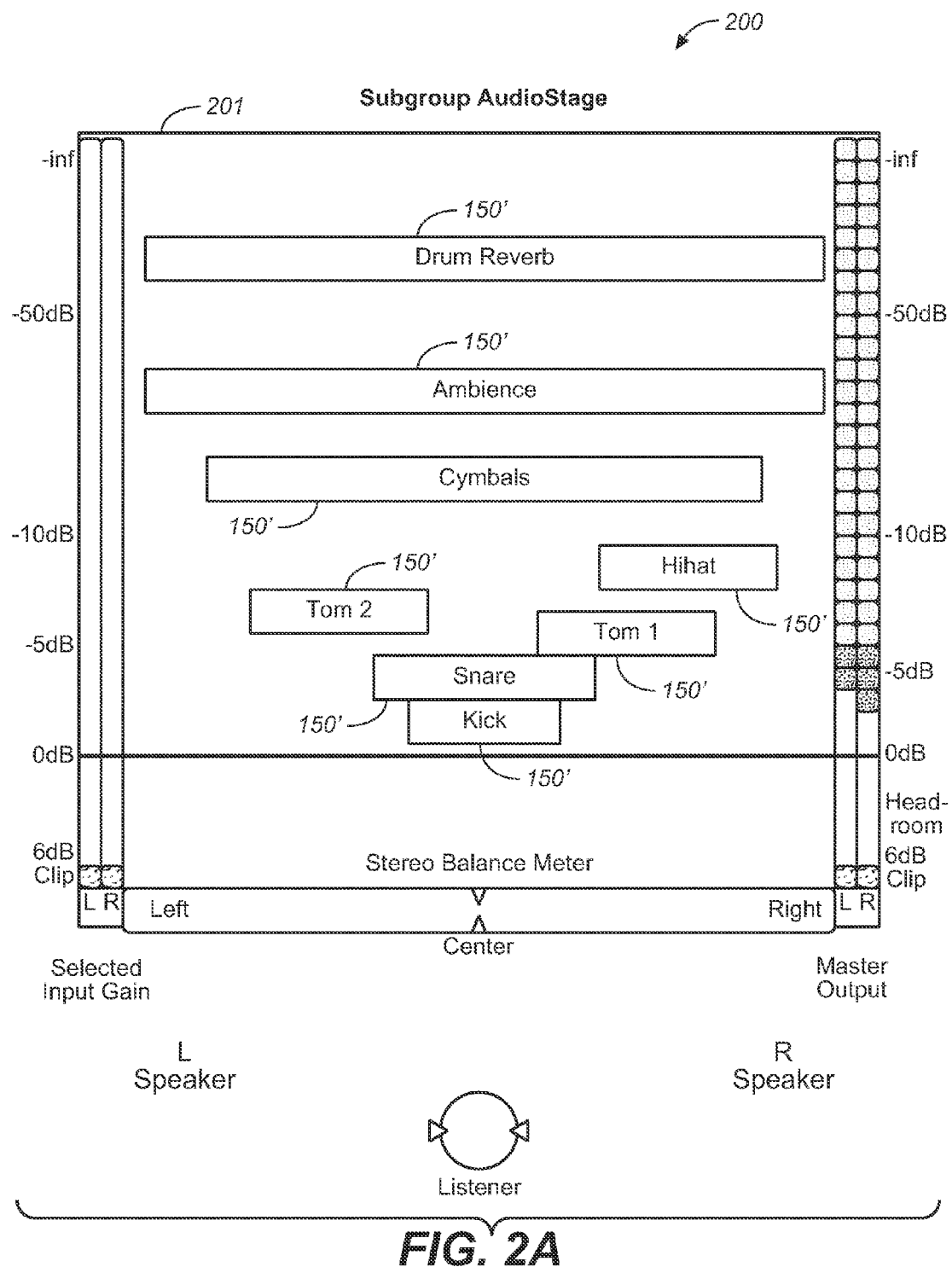
FIG. 2A is an illustration of an example user interface showing a sub-group.

FIG. 2A shows an example user interface 200 illustrating a sub-group displayed on a stage 201. The stage 201, representing the objects included in the sub-group represented by object 151, is shown in response to a specific user input (e.g., clicking a control in the user interface with a mouse or performing a double-click on the object 151). In this example, the object 151 (as shown in FIG. 1A) represents a "Drums Subgroup", including several individual audio objects 150' (e.g., kick, snare, tom1, tom2, hihat, and cymbals). These individual audio objects 150' are displayed on the stage 201. The audio signals associated with the audio objects 150' in the subgroup that the system displays within the stage 201 can be adjusted by the user in a similar way as described before for the stage 102. Therefore, individual audio objects 150' can be grouped together to be represented as a single object 151 on the main audio stage. In some implementations, subgroups contain other subgroups, i.e., subgroups can be nested. The stage 201 shows features corresponding to the features described in connection with stage 102 above. In some implementations, the features of stages displaying sub-groups include additional features specific to sub-groups, e.g., additional controls for grouping and/or un-grouping or switching to another stage.

The system returns to displaying a "main" stage in response to a specific user input (e.g., pressing a key or clicking on a control in the user interface with a mouse). A main stage in this context is simply a stage that contains all objects representing single audio objects, as well as objects that represent a subgroup, the audio objects of which are currently on display on another stage (e.g., stage 201). Thus, the main stage is the main mixing interface.

Figure 2B:
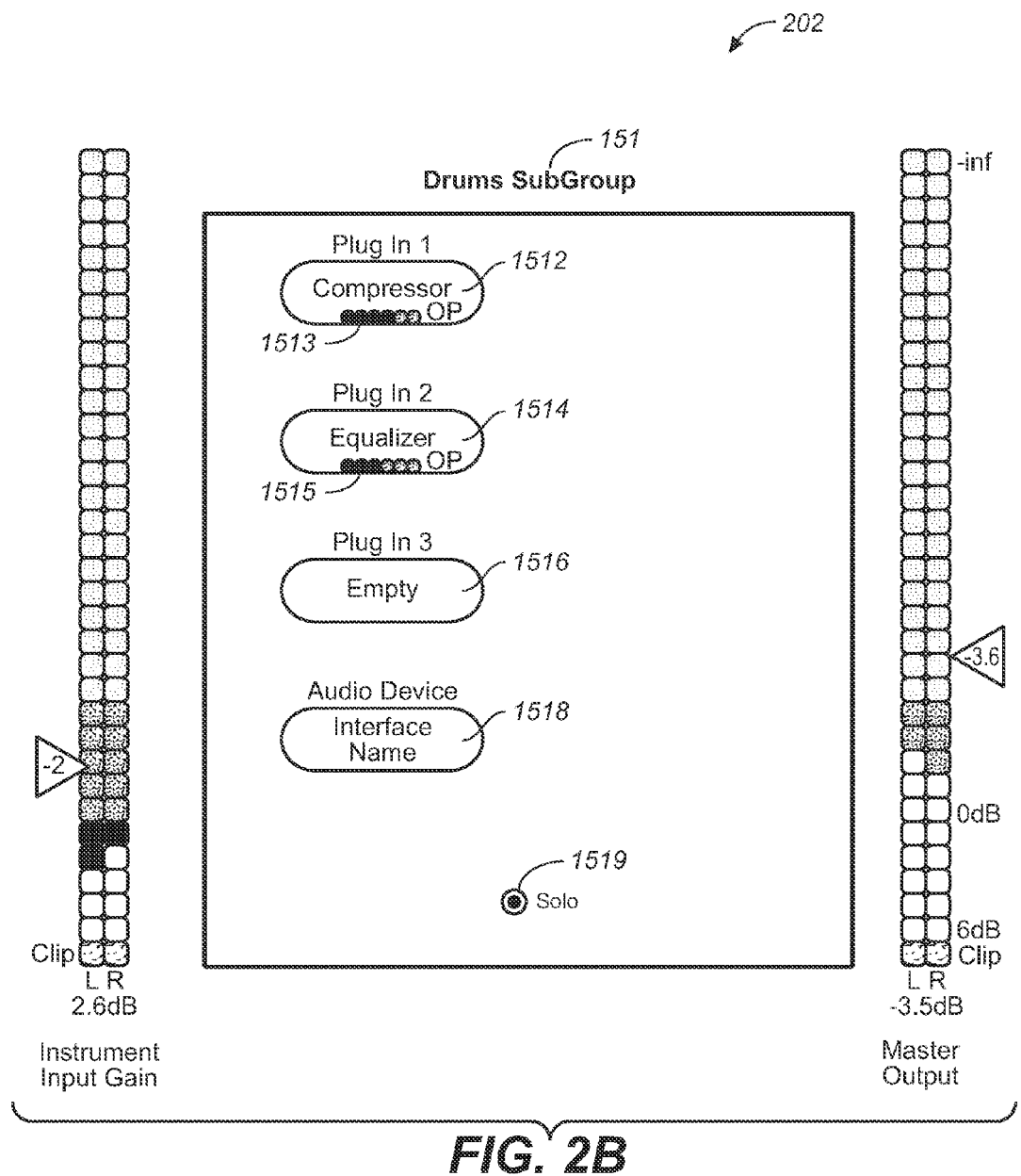
FIG. 2B shows an example user interface illustrating a plug-in overview associated with an object.

FIG. 2B shows an example user interface 202 illustrating a plug-in overview associated with an object, e.g., object 151. A plug-in can be, for example, the software equivalent of an insert. In a hardware environment, an insert is used to add a hardware component, e.g., an equalizer or a compressor, to a signal chain at a specific point in order to modify the signal. In response to a user input in combination with the button 158 (e.g., clicking on the button 158 with a mouse), the system displays a representation of a number of plug-ins associated with the object 151. For example, the object 151 is associated with two plug-ins 1512 and 1514. The plug-in 1512 is a compressor plug-in that compresses the audio signal associated with the object 151 (i.e., the "Drums Subgroup"). The plug-in 1514 is an equalizer plug-in that facilitates effecting multiple different gains to the signal associated with the object 151, where each gain is applied to a different frequency band of the signal.

Plug-ins 1512 and 1514 each feature a level meter 1513 and 1515. The level meters shown in connection with specific plug-ins can be used, e.g., for visually detecting clipping by looking at the meter. A third plug-in 1516 is not in use and is left empty in this example. In some implementations, an arbitrary number of plug-ins is supported. Another element 1518 shows an interface name of the associated audio device. The element 1519 can be, e.g., a checkbox that allows for selection and de-selection. In some implementations, additional information is displayed within the user interface shown in FIG. 2B. In response to a user input, the system returns to a previous stage or the main stage. In response to another user input (e.g., clicking on an individual plug-in), the system displays a user interface directed to the display of the parameters associated with a plug-in.

Figure 2C:
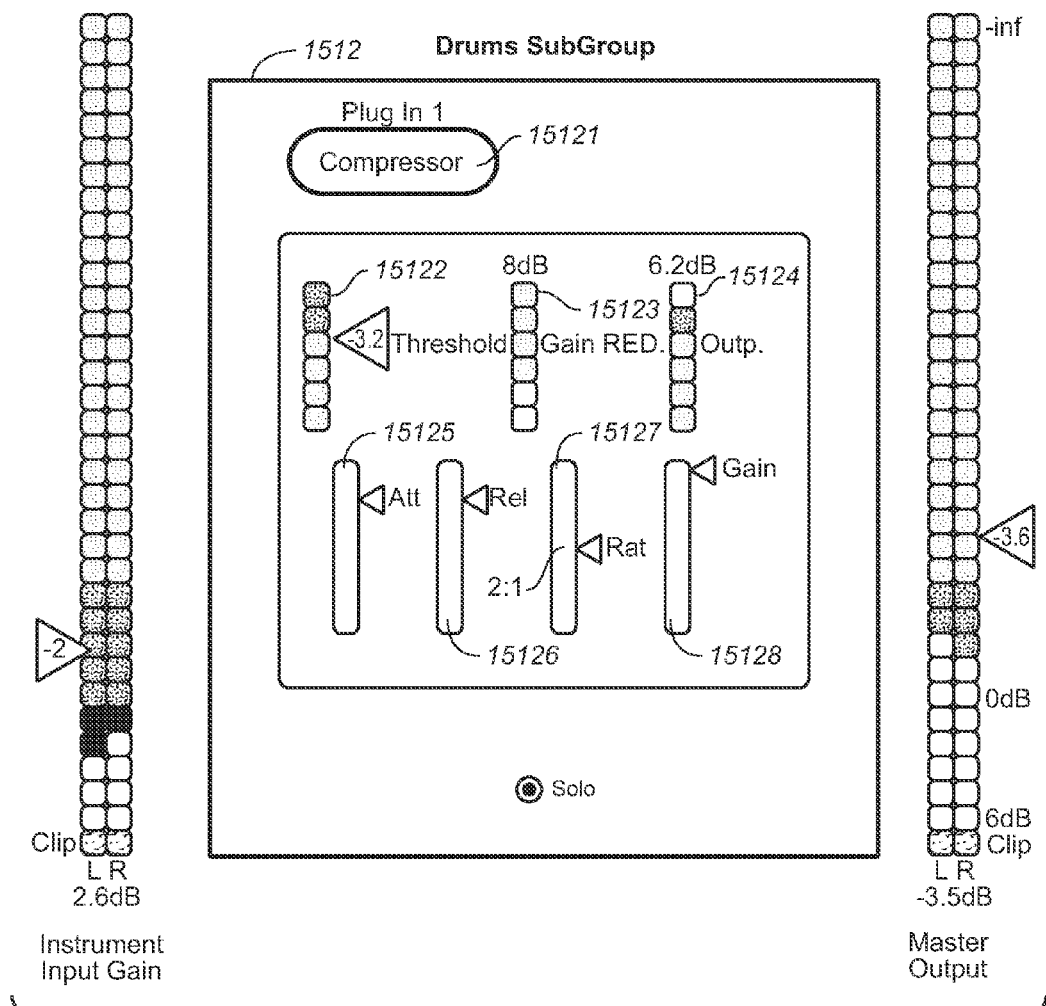

FIG. 2C shows an example user interface 204 for displaying parameters associated with a plug-in such as shown in FIG. 2B, e.g. the compressor plug-in 1512. In FIG. 2C, the element 15121 displays the name and the type of the plug-in that is being configured. The level meters 15122, 15123, and 15124, along with the nearby display of decimal values, display properties and parameters of the plug-in 1512. The parameters of the plug-in 1512 represent, in this example, an attack time, a release time, a compression ratio, and a gain value. In response to a specific user input, the system returns to the previously displayed view of configurable plug-ins, as illustrated in FIG. 2B.

Figure 3A:
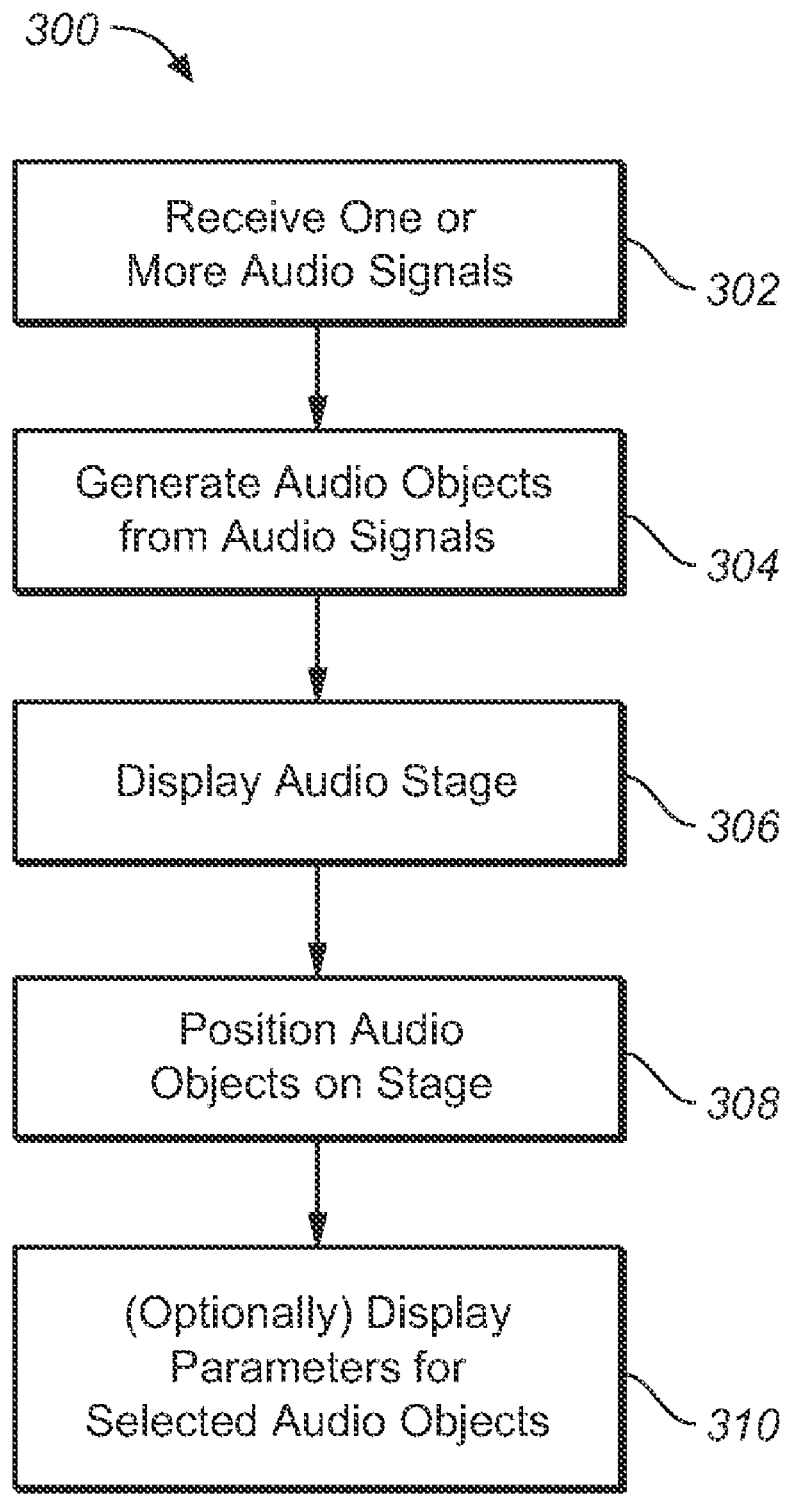
FIG. 3A is a flow chart showing an example process for visualizing audio signals.

FIG. 3A is a flow chart showing an example process 300 for visualizing audio signals. For convenience, the process 300 will be described with respect to a system that performs the process 300.

The system receives 302 one or more audio signals. Audio signals can be received from an FM radio receiver, a compact disc drive playing an audio CD, a microphone, or audio circuitry of a personal computer (e.g., during playback of an audio file). Audio signals can have different properties, including signal intensity, signal kind (e.g., stereo, mono), stereo width, and phase (or phase correlation, e.g., of a stereo signal).

The system generates 304 audio objects from the received audio signals. A single audio object can represent one or more audio signals. For example, a stereo signal includes a left and a right channel, whereas a single audio object can represent the two channels of the stereo signal.

The system displays 306 an audio stage (e.g., stage 102 of FIG. 1A). In addition to one or more audio objects, the system can further display a number of elements on the audio stage, e.g., meters, scales, reference points and lines, controls, and numeric values.

The system positions 308 the one or more audio objects on the stage. The system positions the audio objects according to one or more audio parameters (e.g., intensity, balance, pan, and stereo width).

Figure 3B:
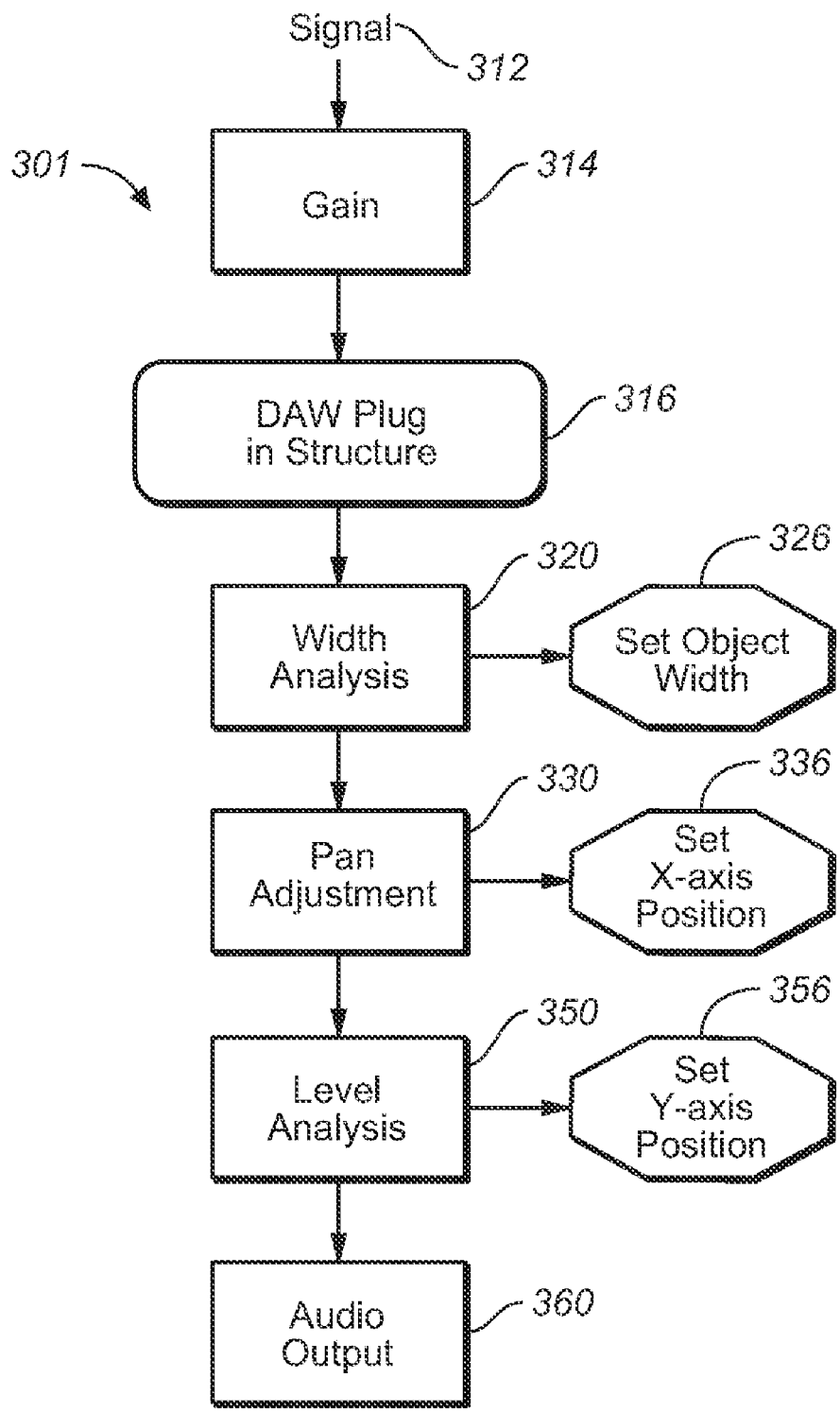
FIG. 3B is a flow chart showing an example process for determining audio and visual properties.

FIG. 3B is a flow chart showing an example process 301 for determining audio and visual properties. For convenience, the process 301 will be described with respect to a system that performs the process 301.

The system receives 312 a signal as input, applies 314 a gain, and routes 316 the signal through a common DAW plug-in structure. A gain 314 can be, for example, a gain associated with a specific audio source (e.g., a microphone). A DAW plug-in structure can be, for example, a series of plug-ins as known from traditional recording equipment (e.g., a signal routing that passes through a series of inserts including an equalizer, a compressor, and a limiter).

The system analyzes 320 the width of a signal and adjusts 326 the width of the corresponding object. The analysis 320 is applied, e.g., when the object has been created by the system in response to receiving a valid routing of an audio signal and when user input adjusting 314 the width of the signal has not been received. Similarly, the system analyzes the width of the signal when the stereo width is adjusted in a manner not effected by the user (e.g., in response to automation data or other input).

The system determines 330 the pan/balance of the corresponding signal, and adjusts 336 (or verifies) the horizontal position of the object.

Similar to the analysis 320, the system analyzes 350 the level in order to adjust 356 the vertical position of the object.

The system optionally displays 310 parameters for selected audio objects. For example, user can select an object and in response to a user input, the system can, for example, display additional information about the object or display additional elements and/or controls.

Figure 5:
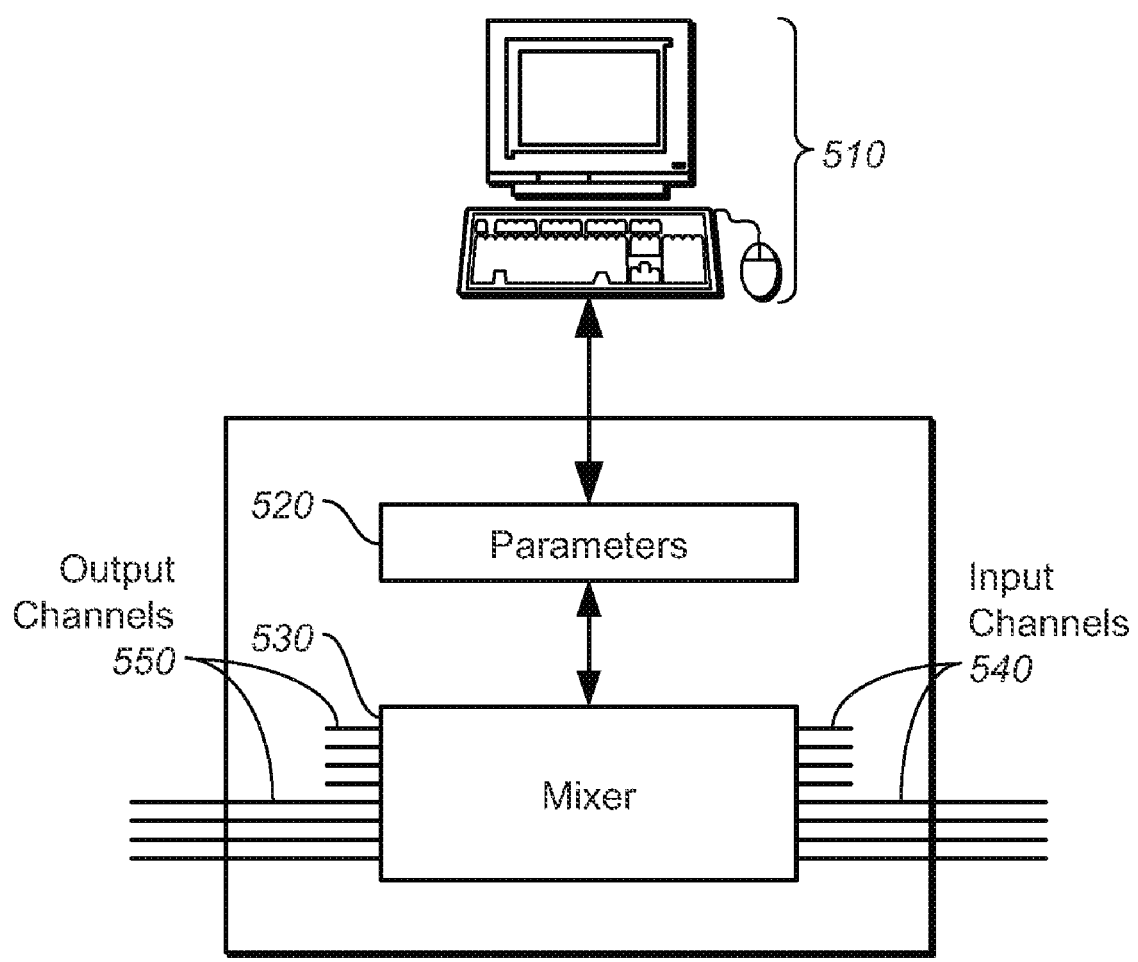
FIG. 5 is a block diagram of an example system.

FIG. 5 is a block diagram of an example system 500. In the system 500, a user interface (e.g., the user interface 102 in FIG. 1A) is generated by software running on a computer 510 that has conventional display, keyboard and pointing devices and supports a conventional graphical user interface. Using this software, a mixer interacts with the user interface as described above and the software displays parameters 520 that are provided by the mixer 530.

These parameters describe the mixing of signals received by the mixer 530 on input channels 540 in order to produce a mixed signal or multiple mixed signals on one or more respective output channels 550. Such parameters can be provided to the mixer 530 using, for example, a MIDI protocol, an Open Sound Control protocol, an IEEE 1394 protocol, a USB protocol, or any other protocol to transfer information between the hardware and the software either asynchronously or isochronously. Alternatively, and more commonly, the audio mixer itself is implemented in DAW software running on the computer 510 implementing the user interface or on a computer in communication with it, and the audio inputs and outputs are realized as digital audio data.

Generally, the matching of audio sources and mixer parameters with icons in the user interface can be done in any of the ways well known in the domain of user interfaces, and need not be described further.

Figure 6:
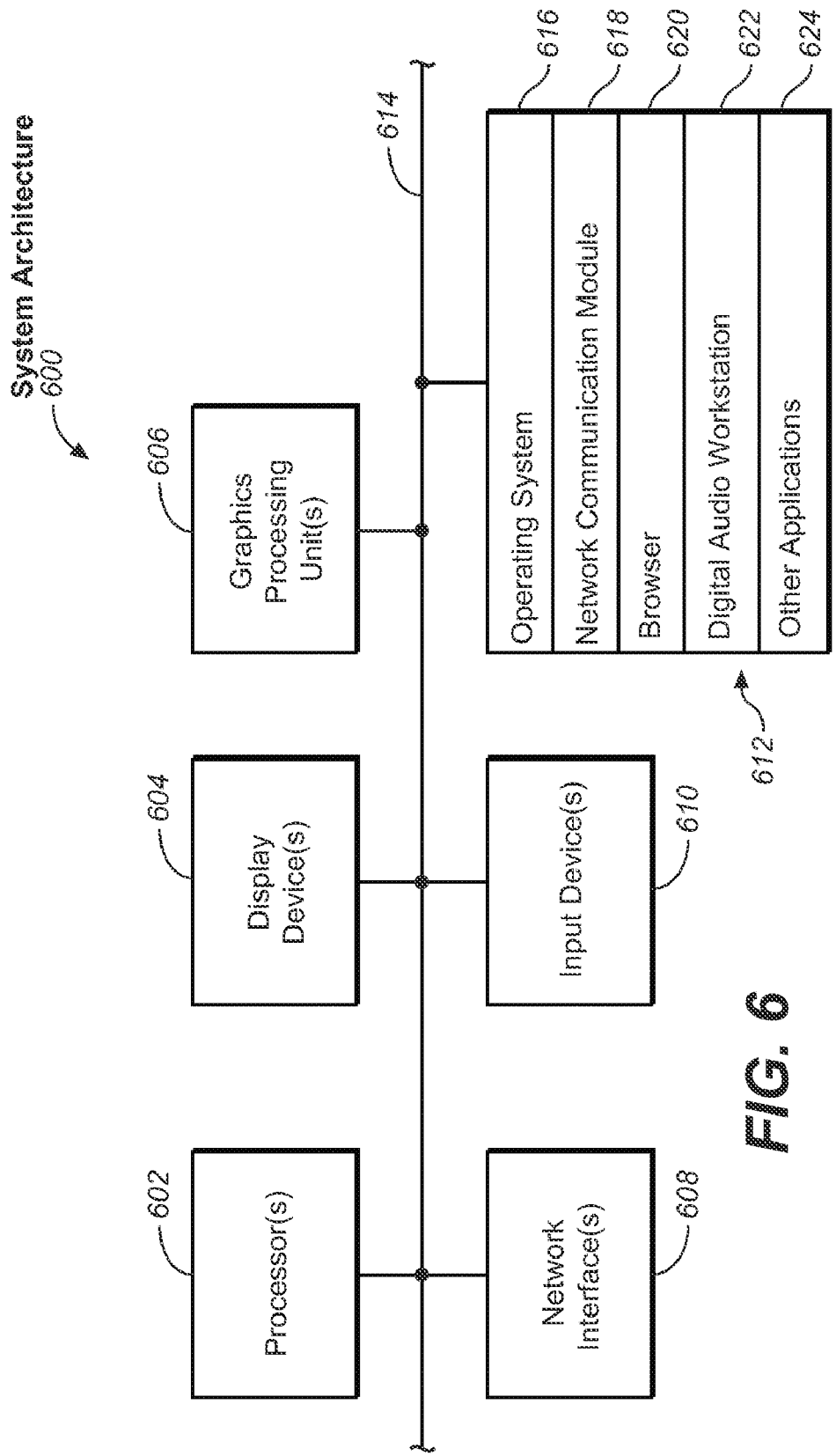
FIG. 6 is a block diagram of an exemplary user system architecture.

FIG. 6 is a block diagram of an exemplary user system architecture 600. The system architecture 600 is capable of hosting a audio processing application that can electronically receive, display, and edit one or more audio signals. The architecture 600 includes one or more processors 602 (e.g., IBM PowerPC, Intel Pentium 4, etc.), one or more display devices 1404 (e.g., CRT, LCD), graphics processing units 606 (e.g., NVIDIA GeForce, etc.), a network interface 608 (e.g., Ethernet, FireWire, USB, etc.), input devices 610 (e.g., keyboard, mouse, etc.), and one or more computer-readable mediums 612. These components exchange communications and data via one or more buses 614 (e.g., EISA, PCI, PCI Express, etc.).

The term "computer-readable medium" refers to any medium that participates in providing instructions to a processor 602 for execution. The computer-readable medium 612 further includes an operating system 616 (e.g., Mac OS®, Windows®, Linux, etc.), a network communication module 618, a browser 620 (e.g., Safari®, Microsoft® Internet Explorer, Netscape®, etc.), a digital audio workstation 622, and other applications 624.

The operating system 616 can be multi-user, multiprocessing, multitasking, multithreading, real-time and the like. The operating system 616 performs basic tasks, including but not limited to: recognizing input from input devices 610; sending output to display devices 604; keeping track of files and directories on computer-readable mediums 612 (e.g., memory or a storage device); controlling peripheral devices (e.g., disk drives, printers, etc.); and managing traffic on the one or more buses 614. The network communications module 618 includes various components for establishing and maintaining network connections (e.g., software for implementing communication protocols, such as TCP/IP, HTTP, Ethernet, etc.). The browser 620 enables the user to search a network (e.g., Internet) for information (e.g., digital media items).

The digital audio workstation 622 provides various software components for performing the various functions for defining and generating the audio stage and audio objects, as described with respect to FIGS. 1-4 including receiving audio signals, using the audio signals to generate audio objects and displaying the audio objects within the audio stage.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving one or more audio signals including digital audio data;
   generating one or more audio objects, each of the one or more audio objects representing one or more audio signals; and
   displaying an interface for representing properties of the audio objects, the interface including a region where each location within the region represents two or more audio properties relative to a virtual listener, where displaying the region includes displaying a region bound by an inner circle and an outer circle, the region having an orientation, the orientation being a reference angle associated with an angular dimension relative to a reference region within the inner circle.

2. The method of claim 1, where the region has a first dimension representing one or more first audio properties and a second dimension representing one or more second audio properties relative to the virtual listener.

3. The method of claim 2, where the one or more first audio properties includes intensity and the one or more second audio properties includes one or more of balance and stereo width.

4. The method of claim 2, further comprising:
   displaying a corresponding representation of each of the one or more audio objects within the interface where the location of a particular audio object representation within the region corresponds to the one or more audio properties in the first and second dimensions.

5. The method of claim 4, where the location of a particular audio object identifies an intensity and a balance or panorama associated with the one or more audio signals corresponding to the audio object.

6. The method of claim 4, where displaying each representation of an audio object includes displaying a representation having a specified width representing a stereo width of the one or more audio signals corresponding to the audio object.

7. The method of claim 1, further comprising:
   displaying a representation of the virtual listener relative to the interface.

8. The method of claim 1, where displaying the interface includes displaying one or more meters, the one or more meters corresponding to audio properties associated with one or more audio objects.

9. The method of claim 8, where the one or more meters include one or more of a level meter, a phase correlation meter, and a goniometer.

10. The method of claim 8, where at least one of the one or more meters displays audio properties associated with a particular audio object in response to an input selecting the particular audio object.

11. The method of claim 1, where displaying the region includes displaying a rectangular region having a first axis and a second axis where:
   a first position of an audio object, according to the first axis, is associated with intensity of a particular audio signal associated with the audio object;
   a second position of an audio object, according to the second axis, is associated with a balance or panorama associated with the one or more audio signals; and
   a size of an audio object according to at least one of dimension is associated with a stereo width.

12. The method of claim 1, wherein:
   a radial distance of an audio object is associated with intensity of a particular audio signal associated with the audio object;
   an angular distance of the audio object is associated with a balance or panorama of the audio object; and
   a size of the audio object is associated with a stereo width.

13. The method of claim 12, further comprising:
   identifying a change in an audio property associated with a particular displayed audio object; and
   modifying the position of displayed audio object according to the identified change.

14. The method of claim 13, where the radial position of the audio object is modified if the identified change is of intensity.

15. The method of claim 13, where the angular position of the audio object is modified if the identified change is of balance or panorama.

16. The method of claim 13, where a size of the audio object is modified if the identified change is in stereo width.

17. The method of claim 13, where identifying a change further comprises:
   periodically analyzing the one or more audio signals associated with the audio object.

18. A computer program product, encoded on a non-transitory computer-readable medium, operable to cause data processing apparatus to perform operations comprising:
   receiving one or more audio signals including digital audio data;
   generating one or more audio objects, each of the one or more audio objects representing one or more audio signals; and
   displaying an interface for representing properties of the audio objects, the interface including a region where each location within the region represents two or more audio properties relative to a virtual listener, where displaying the region includes displaying a region bound by an inner circle and an outer circle, the region having an orientation, the orientation being a reference angle associated with an angular dimension relative to a reference region within the inner circle.

19. The computer program product of claim 18, where the region has a first dimension representing one or more first audio properties and a second dimension representing one or more second audio properties relative to the virtual listener.

20. The computer program product of claim 19, where the one or more first audio properties includes intensity and the one or more second audio properties includes one or more of balance and stereo width.

21. The computer program product of claim 19, further operable to cause data processing apparatus to perform operations comprising:
   displaying a corresponding representation of each of the one or more audio objects within the interface where the location of a particular audio object representation within the region corresponds to the one or more audio properties in the first and second dimensions.

22. The computer program product of claim 21, where the location of a particular audio object identifies an intensity and a balance or panorama associated with the one or more audio signals corresponding to the audio object.

23. The computer program product of claim 21, where displaying each representation of an audio object includes displaying a representation having a specified width representing a stereo width of the one or more audio signals corresponding to the audio object.

24. The computer program product of claim 18, further operable to cause data processing apparatus to perform operations comprising:
   displaying a representation of the virtual listener relative to the interface.

25. The computer program product of claim 18, where displaying the interface includes displaying one or more meters, the one or more meters corresponding to audio properties associated with one or more audio objects.

26. The computer program product of claim 25, where the one or more meters include one or more of a level meter, a phase correlation meter, and a goniometer.

27. The computer program product of claim 25, where at least one of the one or more meters displays audio properties associated with a particular audio object in response to an input selecting the particular audio object.

28. The computer program product of claim 18, where displaying the region includes displaying a rectangular region having a first axis and a second axis where:
   a first position of an audio object, according to the first axis, is associated with intensity of a particular audio signal associated with the audio object;
   a second position of an audio object, according to the second axis, is associated with a balance or panorama associated with the one or more audio signals; and
   a size of an audio object according to at least one of dimension is associated with a stereo width.

29. The computer program product of claim 18, wherein:
   a radial distance of an audio object is associated with intensity of a particular audio signal associated with the audio object;
   an angular distance of the audio object is associated with a balance or panorama of the audio object; and
   a size of the audio object is associated with a stereo width.

30. The computer program product of claim 29, further comprising:
   identifying a change in an audio property associated with a particular displayed audio object; and
   modifying the position of displayed audio object according to the identified change.

31. The computer program product of claim 30, where the radial position of the audio object is modified if the identified change is of intensity.

32. The computer program product of claim 30, where the angular position of the audio object is modified if the identified change is of balance or panorama.

33. The computer program product of claim 30, where a size of the audio object is modified if the identified change is in stereo width.

34. The computer program product of claim 30, where identifying a change further comprises:
   periodically analyzing the one or more audio signals associated with the audio object.

35. A system comprising a processor and a memory operable to perform operations including:
   receiving one or more audio signals including digital audio data;
   generating one or more audio objects, each of the one or more audio objects representing one or more audio signals; and
   displaying an interface for representing properties of the audio objects, the interface including a region where each location within the region represents two or more audio properties relative to a virtual listener, where displaying the region includes displaying a region bound by an inner circle and an outer circle, the region having an orientation, the orientation being a reference angle associated with an angular dimension relative to a reference region within the inner circle.

36. The system of claim 35, where the region has a first dimension representing one or more first audio properties and a second dimension representing one or more second audio properties relative to the virtual listener.

37. The system of claim 36, where the one or more first audio properties includes intensity and the one or more second audio properties includes one or more of balance and stereo width.

38. The system of claim 36, further comprising:
   displaying a corresponding representation of each of the one or more audio objects within the interface where the location of a particular audio object representation within the region corresponds to the one or more audio properties in the first and second dimensions.

39. The system of claim 38, where the location of a particular audio object identifies an intensity and a balance or panorama associated with the one or more audio signals corresponding to the audio object.

40. The system of claim 38, where displaying each representation of an audio object includes displaying a representation having a specified width representing a stereo width of the one or more audio signals corresponding to the audio object.

41. The system of claim 35, further comprising:
displaying a representation of the virtual listener relative to the interface.

42. The system of claim 35, where displaying the interface includes displaying one or more meters, the one or more meters corresponding to audio properties associated with one or more audio objects.

43. The system of claim 42, where the one or more meters include one or more of a level meter, a phase correlation meter, and a goniometer.

44. The system of claim 42, where at least one of the one or more meters displays audio properties associated with a particular audio object in response to an input selecting the particular audio object.

45. The system of claim 35, where displaying the region includes displaying a rectangular region having a first axis and a second axis where:
a first position of an audio object, according to the first axis, is associated with intensity of a particular audio signal associated with the audio object;
a second position of an audio object, according to the second axis, is associated with a balance or panorama associated with the one or more audio signals; and
a size of an audio object according to at least one of dimension is associated with a stereo width.

46. The system of claim 35, wherein:
a radial distance of an audio object is associated with intensity of a particular audio signal associated with the audio object;
an angular distance of the audio object is associated with a balance or panorama of the audio object; and
a size of the audio object is associated with a stereo width.

47. The system of claim 46, further comprising:
identifying a change in an audio property associated with a particular displayed audio object; and
modifying the position of displayed audio object according to the identified change.

48. The system of claim 47, where the radial position of the audio object is modified if the identified change is of intensity.

49. The system of claim 47, where the angular position of the audio object is modified if the identified change is of balance or panorama.

50. The system of claim 47, where a size of the audio object is modified if the identified change is in stereo width.

51. The system of claim 47, where identifying a change further comprises:
periodically analyzing the one or more audio signals associated with the audio object.

* * * * *